(12) United States Patent
Motsenbocker

(10) Patent No.: US 11,205,899 B2
(45) Date of Patent: Dec. 21, 2021

(54) INTERRUPTED DC APPLICATIONS

(71) Applicant: Marvin Motsenbocker, Kamijima (JP)

(72) Inventor: Marvin Motsenbocker, Kamijima (JP)

( * ) Notice: Subject to any disclaimer, the term of this patent is extended or adjusted under 35 U.S.C. 154(b) by 376 days.

(21) Appl. No.: 16/112,812

(22) Filed: Aug. 27, 2018

(65) Prior Publication Data
US 2019/0074695 A1 Mar. 7, 2019

Related U.S. Application Data

(60) Provisional application No. 62/553,799, filed on Sep. 2, 2017, provisional application No. 62/696,336, filed on Jul. 11, 2018.

(51) Int. Cl.
*H02J 3/38* (2006.01)
*H02H 7/20* (2006.01)
*H02J 9/04* (2006.01)
*F24H 1/18* (2006.01)

(52) U.S. Cl.
CPC ............. *H02J 3/385* (2013.01); *F24H 1/185* (2013.01); *H02H 7/20* (2013.01); *H02J 9/04* (2013.01); *F24D 2200/02* (2013.01)

(58) Field of Classification Search
CPC .. H02J 3/385; H02J 9/04; F24H 1/185; H02H 7/20; F24D 2200/02
See application file for complete search history.

(56) References Cited

U.S. PATENT DOCUMENTS

| | | | | |
|---|---|---|---|---|
| 9,257,896 | B1* | 2/2016 | Shih | G05F 1/67 |
| 2012/0187106 | A1* | 7/2012 | Ashkenazy | H02J 3/385 |
| | | | | 219/438 |
| 2013/0327077 | A1* | 12/2013 | Motsenbocker | F25B 27/005 |
| | | | | 62/324.1 |
| 2014/0049170 | A1* | 2/2014 | Zhang | H05B 45/18 |
| | | | | 315/185 R |
| 2014/0265573 | A1* | 9/2014 | Kreutzman | F24H 1/185 |
| | | | | 307/31 |
| 2016/0141879 | A1* | 5/2016 | Motsenbocker | H02J 3/02 |
| | | | | 307/18 |
| 2018/0034268 | A1* | 2/2018 | Motsenbocker | H02J 1/08 |
| 2018/0080683 | A1* | 3/2018 | Branecky | F24H 1/201 |
| 2019/0003725 | A1* | 1/2019 | Hourigan | H02M 1/10 |

\* cited by examiner

*Primary Examiner* — Carlos Amaya
(74) *Attorney, Agent, or Firm* — Marvin Motsenbocker

(57) ABSTRACT

Solar electricity is used more efficiently and at lower cost via the technique of interrupted DC power. Interrupted DC removed the spark problem from high voltage DC circuits, allowing their use with normal appliances. Wasteful and expensive inductor based voltage changes were avoided by adjusting solar panel output voltage via loading. This provided prioritization of use among appliances. Furthermore, the extreme decrease in sparking obtained by interrupted DC allows for the manufacture and use of lower cost direct current circuit breakers that are self powered and provide protected circuits of greater than 99% direct current purity.

5 Claims, 12 Drawing Sheets

INTERRUPTED DC APPLICATIONS

FIELD OF THE INVENTION

This is in the field of solar electric power usage and more particularly in the area of devices that utilize solar DC electricity.

BACKGROUND

A problem with using solar electric power is that high DC voltage at high current causes excess sparking in switches and rheostats. This sparking damages low cost circuit breakers, switches and rheostats and requires more expensive alternatives. Many users opt instead to use low voltage DC systems. Thus, any device or technique that can use existing breakers, switches and rheostats with high voltage and high power DC would save much infrastructure cost and complexity.

Abundant solar energy during sunshine often is needed after dark. Batteries and other storage systems are therefore used, but drastically raise costs. Systems and devices are needed that can utilize energy from solar electric at night at low cost.

SUMMARY

A water heater stores solar electric energy during sunshine and provides that energy 24 hours. This solar electric heat battery eliminates the battery problem for approximately one third of all home energy needs and can be used to make hot water in offices and factories as well.

Preferably an insulated water tank includes a heating element inside and an interface circuit that connects to solar panels at high voltage (more than 100 volts in the United States and in Japan, more than 200 volts in China, and other countries of Europe, Africa, and Asia). The circuit connects the solar panel input high voltage directly to the heating element(s) via a pulse width modulation circuit. This circuit has a feed forward control or MPPT (maximum point power tracking) control that decreases duty cycle (decreases pulse width) when sunlight drops in order to maintain a target or optimum loading voltage output from the solar panels.

For safety, preferably the solar panel input to the water tank circuit is not connected to ground and the water tank power circuit is not connected to ground. Preferably a circuit monitors for ground in a solar input line(s) or tank power lines and alerts the presence of a ground connection.

Water Heater Powered Directly by Solar Electric

Problems in the art are addressed by a device that connects directly to DC solar electric input power and to regular AC powered electric water heaters or modified gas (propane, natural gas) heaters. The device allows the solar electric output to heat hot water without inefficient DC/AC or voltage changes. Also, solar energy produced at low light levels (cloudy times or rain) is used at high efficiency (typically above 95%) to charge the water heater battery with heat energy even during cloudy or rainy days.

DETAILED DESCRIPTION

Figure 1:
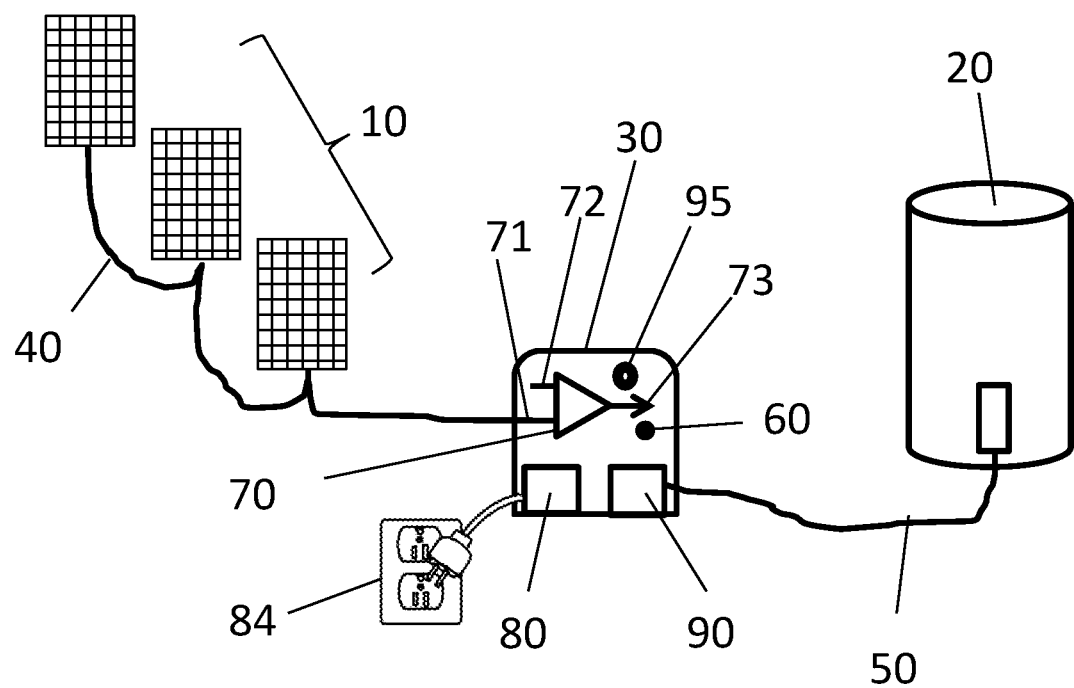
FIG. 1 shows a device connecting a source of solar electricity to an electric hot water heater.

A high efficiency, low cost system for using solar electric to heat water is shown in FIG. 1. A direct current ("DC") source of solar electric power (such as solar panels 10) is connected via wire 40 to device 30. Device 30 also connects to electric hot water tank 20 via wire 50. Optionally, device 30 connects to backup power 84 to allow heating of the tank water from another source during extended days of no sunshine. Preferably no battery is connected, no more than one transistor junction is between the solar electric power source and the heating element, and no inductor is used to modify solar power output voltage.

Solar power 10 is direct current and provides a voltage that powers a resistance heating element within water tank 20. For example tank 20 may have a 220 volt AC RMS (root mean square) heating element. The output of solar power should be enough to heat this and may be for example, between 50 and 240 volts DC, and preferably at least 100 volts. It was found that available AC heater elements work well with lower DC voltages, and allow a slower heating time more compatible with hours long daily sunshine availability.

The preferred voltage can be determined by comparing the maximum power output voltage of the solar panels and the rated wattage of the heater. Preferably the solar output wattage is at least one fifth the wattage rating of the heating element for the voltage used, although any voltage output up to the AC RMS voltage rating of the element is sufficient. In an embodiment a higher voltage than the AC rating may be used in combination with a commensurately decreased maximum duty cycle to prevent overheating the element.

A skilled artisan can connect solar panels in series to achieve the desired voltage output. Preferably the rated solar maximum power voltage output of connected panels output is about 5-20 percent higher than the desired voltage such as 110 or 220 DC volts to allow for decreased voltage due to panel heating if an MPPT controller is not used to control for this.

Device 30 determines the loading of the solar power by adjusting duty cycle of power delivered to heater 20. Device 30 comprises three structural components. Component 70 is a feed forward voltage control. This control may be a circuit comprising a comparator with one input 71 that samples voltage from the solar power, and another input 72 connected to a voltage reference. The output 73 drives a PWM (Pulse Width Modulation) device or functionality in a microcontroller or microprocessor chip. In an embodiment component 70 instead is an MPPT controller or algorithm that adjusts loading for optimum solar panel power output.

As the solar power voltage approaches or meets a predetermined threshold voltage, the comparator outputs a signal to increase (or start) conduction of power from power source 10 to tank 20 via increasing duty cycle of a controlled PWM. This serves to maintain the solar power output voltage within a small range, which should be below (preferably up to 10% below) the solar maximum power voltage output, depending on temperature effects. For solar panels that are highly sensitive to voltage drop with increased temperature, and that experiences high panel temperatures (eg. >60 degrees Centigrade) the threshold voltage typically may be set to 10-25% below the maximum power voltage of the series connected panels. In another embodiment the loading is controlled by a MPPT type control circuit that determines threshold voltage in real time instead.

Comparator 70 preferably is part of a micro controller or microprocessor that operates a stored program to execute a feed forward voltage control (or MPPT based voltage set control) that achieves a maximum power input by increased loading with increased input voltage. Preferably structural components 70 and 90 are combined in one microprocessor or microcontroller.

The feed forward control signal from comparator 70 or MPPT determined optimum voltage controls PWM (duty cycle) action of a switch (such as a transistor) that connects power flow from solar power 10 to tank 20. In the case of an MPPT control, the MPPT causes the percent duty cycle to decrease in order to increase the solar panel output voltage and causes the percent duty cycle to increase to decrease the solar panel output voltage. Preferably the solar power input is connected to the tank 20 by only one transistor between them. In an embodiment an N-MOSFET transistor is used with the source and drain connections connected to input 40 and output 50, and with a gate connected to the PWM output.

Optionally an external power 84 such as utility power can be added in parallel to supplement or replace the solar power when needed. Pilot light 60 is preferred to indicate power is available to the heater tank.

Optionally the device further contains a user input 95 (preferably a hand operated push, slide or touch button) that connects the backup power 84 (preferably an AC utility supplied power) to tank 20 for a set time or condition. When insufficient sunlight is available and a user wants hot water, the user activates this switch. In one embodiment the switch is connected to a timer, which turns on backup power 84 for a set time configured to heat the tank by a certain amount such as increasing water temperature from 25 degrees C. to 45 degrees C. over a 60 minute period. In an embodiment, the amount of set time is user set by a potentiometer or other input. This embodiment allows the user to compromise by using backup utility electricity for a limited time only when needed.

In another embodiment the user activated switch 95 activates connection between backup power 84 to tank 20 until the tank thermostat opens or a set temperature is reached. In this case, a current load monitor may be used and the tank heats from power 84 (after user activation) until the sensed current flowing to the tank stops or set temperature reached. When the current stops, the connection to the tank from power 84 is terminated and does not start again until the next user activation. Preferably the load sensor is a small series resistance (between 0.0002 ohm to 0.1 ohm and more preferably 0.0.001 to 0.01 ohm) in the current flow path to tank 20.

In an embodiment a hall effect sensor is used to generate a current load signal. The small voltage developed across the resistor (or load signal from hall effect sensor) is amplified and compared with a reference to determine if the tank is being heated or no longer being heated from power 84. When the signal indicates loss of current flow, the switching is reset (the tank has been heated). Preferably this is carried out by a microcontroller or microprocessor which switches a transistor (eg. MOSFET or IGBT, silicon controlled rectifier, Triac or even a mechanical relay that connects power 84 with tank 50.

In an embodiment a temperature sensor in thermal contact with the tank is used to determine the end of the heating cycle. The sensor may generate a signal that is compared with a threshold reference value.

Figure 2:
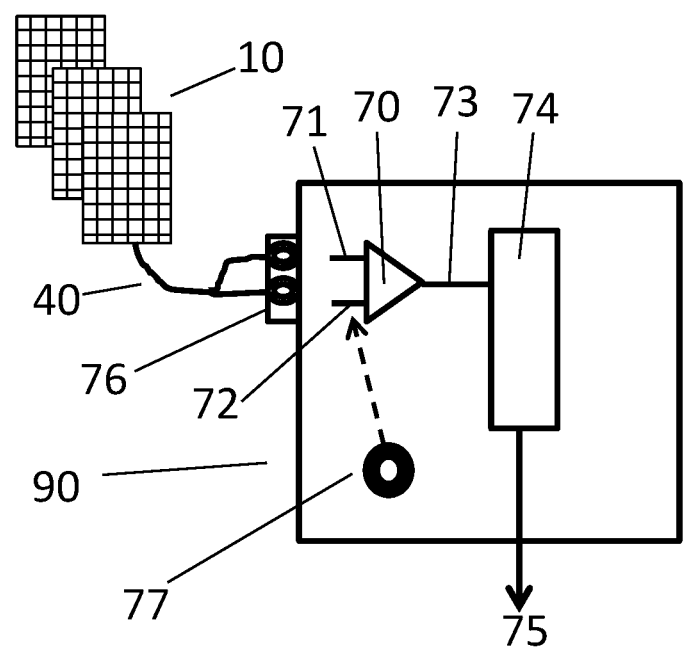
FIG. 2 shows internal structure of a device in an embodiment.

FIG. 2 shows detail for a combination of comparator 70 inside PWM controller 90. Input connection 76 (preferably a terminal strip or spring loaded connectors for + and − polarity) connects to solar input power 10. Comparator 70 samples the input voltage, preferably via a resistive voltage divider and compares to voltage reference signal 72. The comparator output 73 is used by a PWM controller 74 to control a transistor by a PWM signal train 75. Preferably the periodicity of the PWM train is at least 200 pulses per second, more preferably at least 500. Good results were obtained with periodicities up to 8,000 although frequencies above 20,000 are desirable in some situations to avoid audible noise. Preferably the off time for full power is less than 3% of the duty cycle and more preferably less than 1%.

Dithering (constantly changing frequency) may be used to avoid acoustic oscillation. Preferably in dithering, frequencies of greater than 120 hertz, and particularly above 500 hertz are changed by at least two fold over one second of time to avoid acoustic oscillation.

The comparator may be part of a micro-controller or other microprocessor, or a discrete device that feeds a buffer and/or PWM 74. Alternately this may be an MPPT signal output. A user operable voltage threshold input 77 sets the threshold, preferably by adjusting a voltage reference 72 for the comparator. In an embodiment input 77 is an adjustable potentiometer that adjusts a reference voltage.

In an embodiment input 77 is another user input such as a key pad or screen touch input to a cell phone input or computer that communicates with device 30. In practice, an installer of the system would wire up solar power 10 having a known nominal maximum power voltage and set input 77 for a threshold voltage 72 below that maximum power voltage, or an MPPT control circuit or algorithm may be used. In a preferred embodiment some or all functions (comparator, PWM, user input) take place in a microcontroller, or microprocessor 74 which may interact with one or more components via a stored program. That is, comparator 70 preferentially is part of controller 74. Typically the reference voltage 71 is between 2 and 5.1 volts and the voltage applied to the gate of the transistor that connects power to tank 20 preferably is at least 8 volts and more preferably between 10 and 15 volts, when using a MOSFET power transistor.

In a preferred embodiment backup power 84 may be used (FIG. 1). Power 84 may be AC power from a utility grid. This power may be added by several different structures. In a first embodiment, solar power DC 10 is disconnected from tank 20 and then wires that connect to 84 are switched mechanically or electronically to connect 84 to tank 20 to replace missing solar power. In this configuration AC power can be used without conversion to DC.

Figure 3:
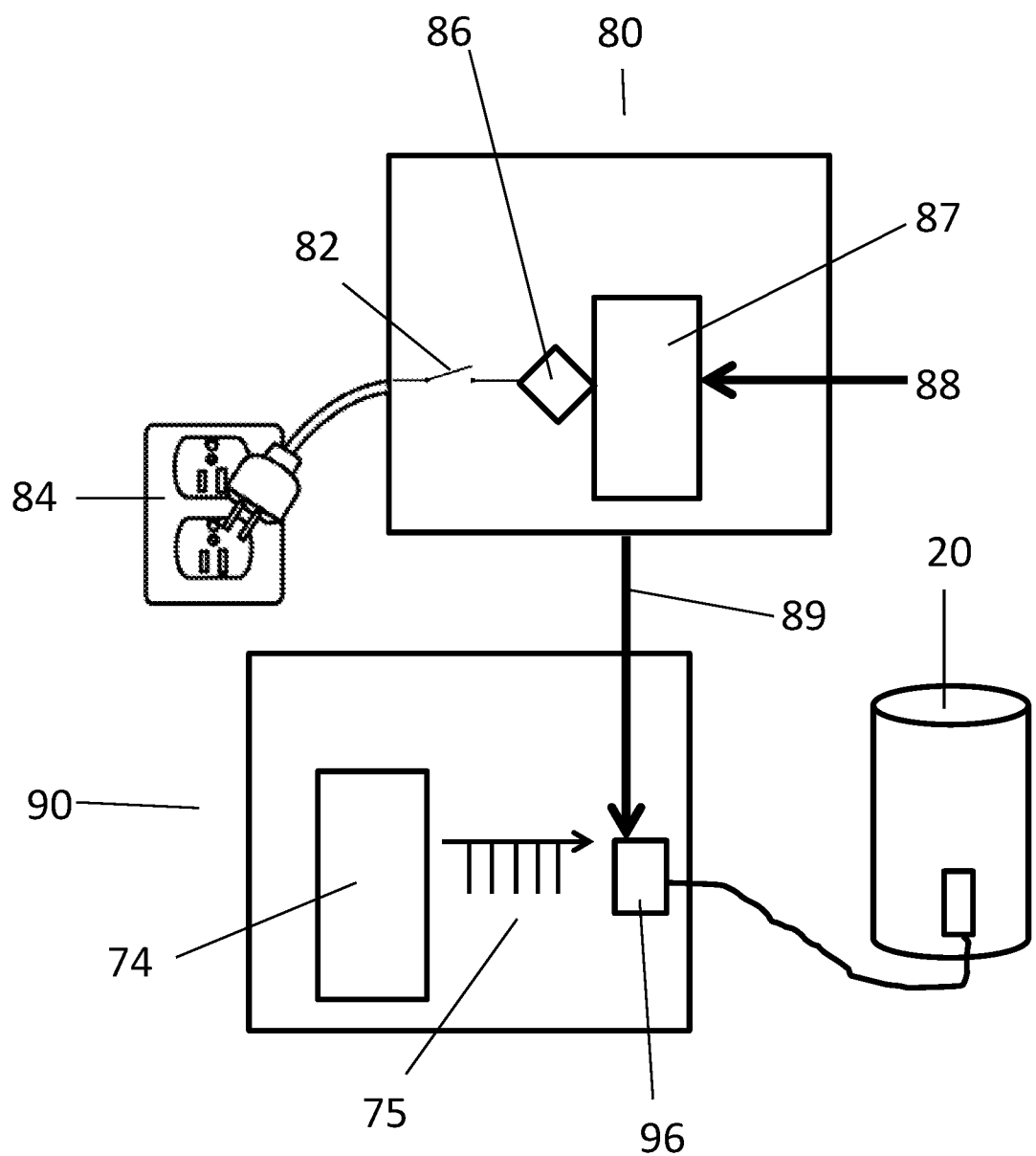
FIG. 3 shows a structure that controls backup utility power in an embodiment.

In a preferred embodiment (FIG. 3) AC power from 84 is selected by a switch 82 and converted into DC by full wave (active or passive) rectifier 86, and connected in parallel via connection 87 to incoming solar power input 88. Power from both sources 89 flows to tank 20 after flowing through transistor 96, which is interrupted to create interrupted DC by signal 75 created by PWM 74. In this case, a user can decide to utilize the backup power with a simple switch 82 mechanism or remote switch operated by cell phone or other device. Preferably both the + and − leads of solar power input 88 are not grounded and preferably utility power is isolated from ground via an isolation transformer.

When adding solar and backup power in parallel, it is preferred to select solar power input voltage that is higher than the RMS AC voltage of the backup power. In this way, as solar power becomes insufficient, the voltage at 88 slowly drops until the voltage reaches the backup utility power DC rectified voltage supplied by 86, at which point the backup power will slowly increase its proportion of power supplied to tank 30 as the solar power decreases with decreasing sunlight.

Component 90 shows combined power 89 from 87 switched by transistor (or other type of) switch 96 under control of PWM generator 74. Generator 74 activates the switch in a feed forward input voltage control system by increasing duty cycle or turning on transistor control signal 75 in response to voltage at or above a threshold.

Preferably the switch creates interrupted DC of at least 100 hertz, 200 hertz, at least 1000 hertz or even a higher interrupt rate to minimize sparking in thermostat or mechanical switch. In an embodiment the PWM control is replaced with an on/off signal with strong hysteresis to prevent on-off oscillations. That is, turn on occurs at a higher voltage than turn off, using a simple on-off regimen instead of PWM. Preferably components 70, 80 and 90 are on a common circuit board, with only a single switched power transistor 96 that is mechanically fixed to a heat sink or metal side wall of device 30.

Figure 4:
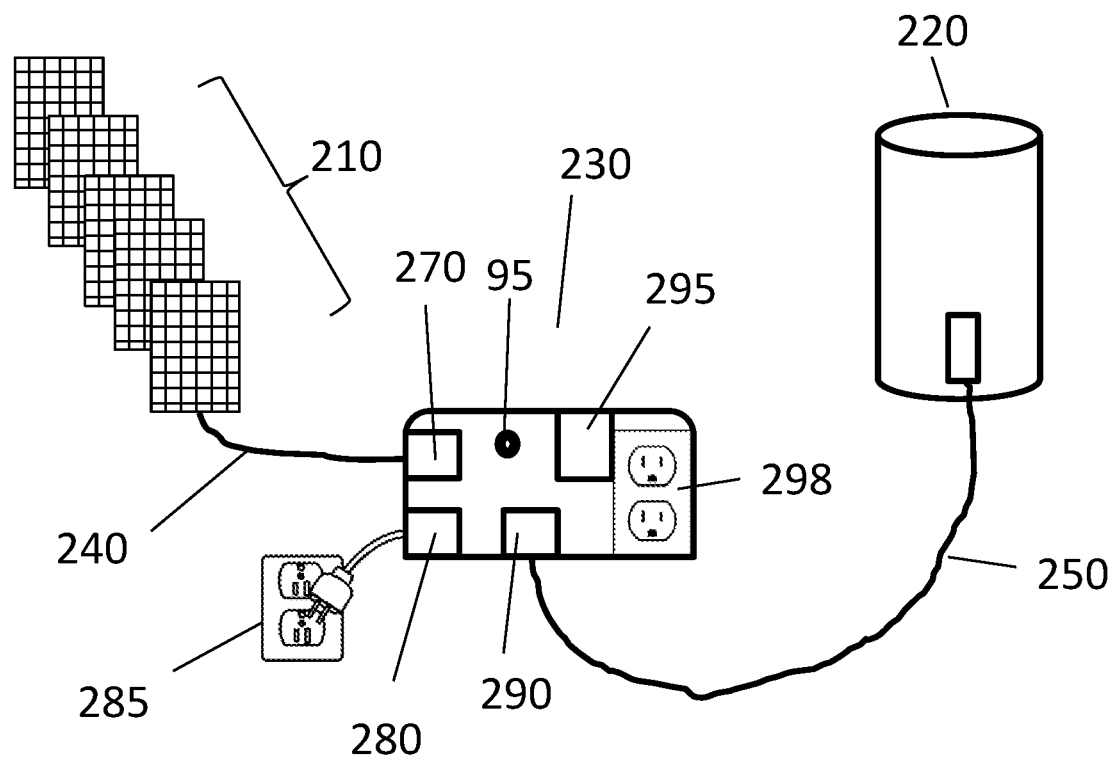
FIG. 4 shows a device connected between a source of solar electricity and an electric hot water heater.

The embodiment shown in FIG. 4 further includes a second feed forward voltage control circuit for receptacle circuit 298 and a controller that provides power to another appliance that connects to receptacle 298. This second feed forward control circuit has a threshold voltage that is lower (eg. by at least 0.2 v, 0.5V, 1V, 2V or more) than the threshold voltage of the first control circuit, which controls power to tank 220. In this way, power to receptacle 298 is higher priority than power to tank 220 because as light intensity drops, the voltage from 210 to the load slowly decreases to below the threshold and power to tank 220 is switched off. In an embodiment circuit 298 is at a separate location and preferably connected to wire 240 by a long 2-wire cable.

In a preferred embodiment the first threshold voltage (or nominal MPPT maximum power voltage) for the tank is set above the backup power RMS voltage, which prevents backup power 285 from supplying tank 220 while accepting solar power. Optionally the user can activate backup power for water heating by a switch or by adjusting the first threshold voltage down to or below the backup power RMS voltage.

The second threshold is set at or below the RMS power obtained from backup 285. This allows use of both solar and backup power for appliances such as cell phone chargers, computers and the like that may be plugged into receptacle 298. In an embodiment receptacle 298 has a circuit that is configured to produce (from DC input) interrupted DC power of 0.1-3% off time with at least 100 interrupts per second, and preferably 0.2 to 1% off time of between 200-1000 interrupts per second, or above 1000 interrupts per second. In an embodiment the interrupt rate is high (above 1000 per second) but dithered over a range of frequencies to avoid acoustic singing within the equipment. In another embodiment DC is converted into AC (such as square wave, modified sine wave or sine wave AC) and supplied at receptacle 298 instead of interrupted DC power. In an embodiment receptacle 298 is in a separate enclosure and connected to the rest of the circuit by two power wires.

Electric Water Heater with Propane/Gas Water Heater Backup

Figure 5:
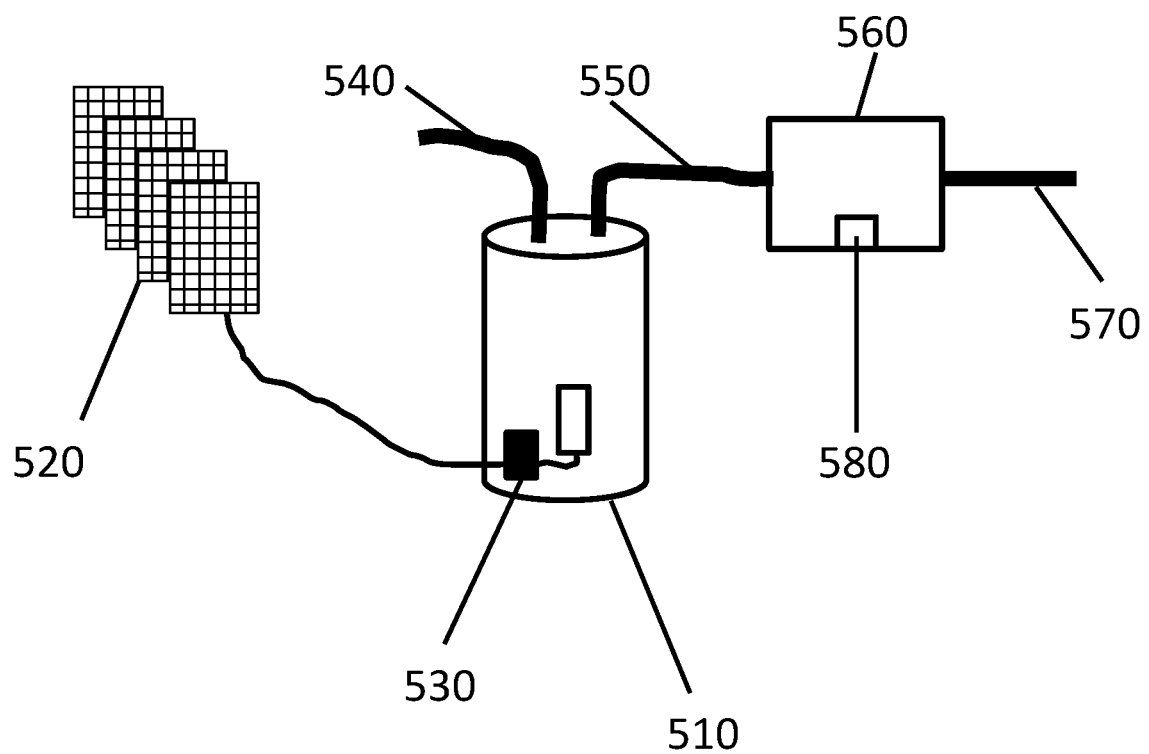
FIG. 5 shows an electric hot water heater backed up by a gas heater.

In an embodiment, an apparatus and system as described for solar electric heating of water is combined with a propane or natural gas heater as backup instead of electricity from a utility company. FIG. 5 shows tank 510 powered by solar panels 520 via circuit 530, which preferably is built into a box attached to tank 510. Tank 510 has cold water input 540 and heated water output 550. Output 550 is fluidically connected to the input of propane hot water tank heater 560, which has a temperature sensor (not shown). When the temperature sensor indicates that flowing water has insufficient temperature, propane (or natural gas) is burned to increase the temperature in output water 570. In this embodiment the solar heater tank acts as a reservoir and the gas heater is an instantaneous heater that turns on only when hot water is used and only when a threshold minimum temperature of water is not met.

Circuit 530 creates an interrupted direct current from solar panels 520 to tank 510 as described above for regular electric hot water tank heating. This circuit controls the load on panels 520 to maintain an optimum or threshold voltage via an MPPT or basic PWM technique as described above. In a preferred embodiment the circuit comprises a feed forward control circuit that compares solar panel voltage output with a reference. The interruption rate and modulation of duty cycle is controlled as described above.

Figure 6:
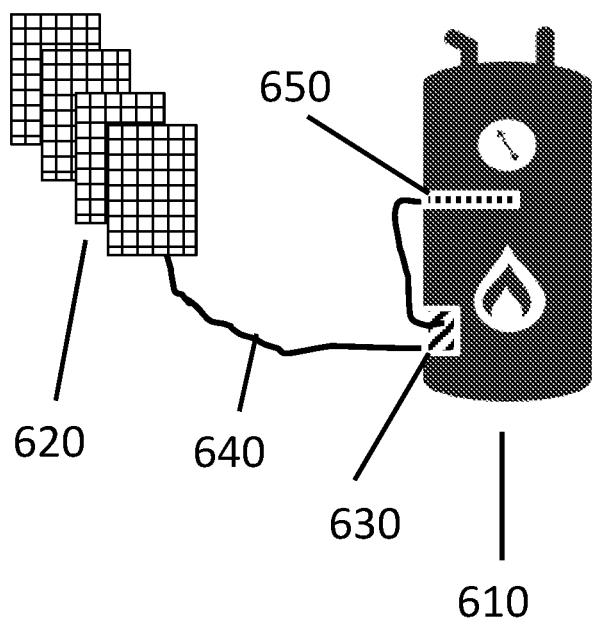
FIG. 6 shows a gas hot water tank with solar electricity fed electric heater within.

In another embodiment shown in FIG. 6, propane hot water tank or natural gas hot water tank 610 has an electrical heating element 650 within. Heating element 650 may electrically connect to a thermostat (not shown) and to device 630 as the circuit described above, which provides feedback controlled interrupted direct current from solar panels. Preferably device 630 is located on or within the water heater housing.

Device 630 creates an interrupted direct current from solar panels 620 to tank 610 as described above for regular electric hot water tank heating. This circuit controls the load on panels 620 to maintain an optimum or threshold voltage via an MPPT or basic PWM technique as described above. In a preferred embodiment the circuit comprises a feed forward control circuit that compares solar panel voltage output with a reference. The interruption rate and modulation of duty cycle is controlled as described above.

This embodiment preferably is implemented by taking an existing large capacity (more than 20 liters) gas heater and adding the electrical heating element to the inside of the water tank, and adding the device to generate interrupted direct current. Preferably a thermostat is added in series with power to the heating element. In an embodiment the thermostat is replaced by a water temperature monitor such as a thermistor which creates a signal that is used to control the duty cycle of the interrupted direct current to the heating element. Upon nearing or reaching a threshold temperature the duty cycle decreases to a low level or turns off. This method can use an inexpensive temperature monitor to avoid electromechanical switching and can even use an electric signal from the existing gas tank temperature monitor.

Preferably the gas heater is not active based on time of day or when a threshold minimum amount of current (or sensed minimum voltage) indicates that a minimum amount of solar electric heating is taking place. In an embodiment the gas heater is only activated at night or upon user activation of a switch, as described above. In an embodiment a ground fault sensor is included to indicate if any part of the circuit has conductivity to earth ground, and activates a warning such as piezo buzzer and/or light upon detection of a ground fault.

High Voltage LED Room Lights Controlled by a Standard AC Switch

This embodiment alleviates the high cost and low efficiency of using low voltage DC (12V, 24V, or 48V) wiring for room lighting by incorporating an interrupted DC device at the controlling switch. In an embodiment high voltage over 100V or over 200V is used with a "standard AC switch" is used that is rated for AC power and normally used for AC power at the high voltage but not DC power at the high voltage. Such switch can not be used for uninterrupted DC of the same voltage and current due to degradation caused by sparking.

Figure 7:
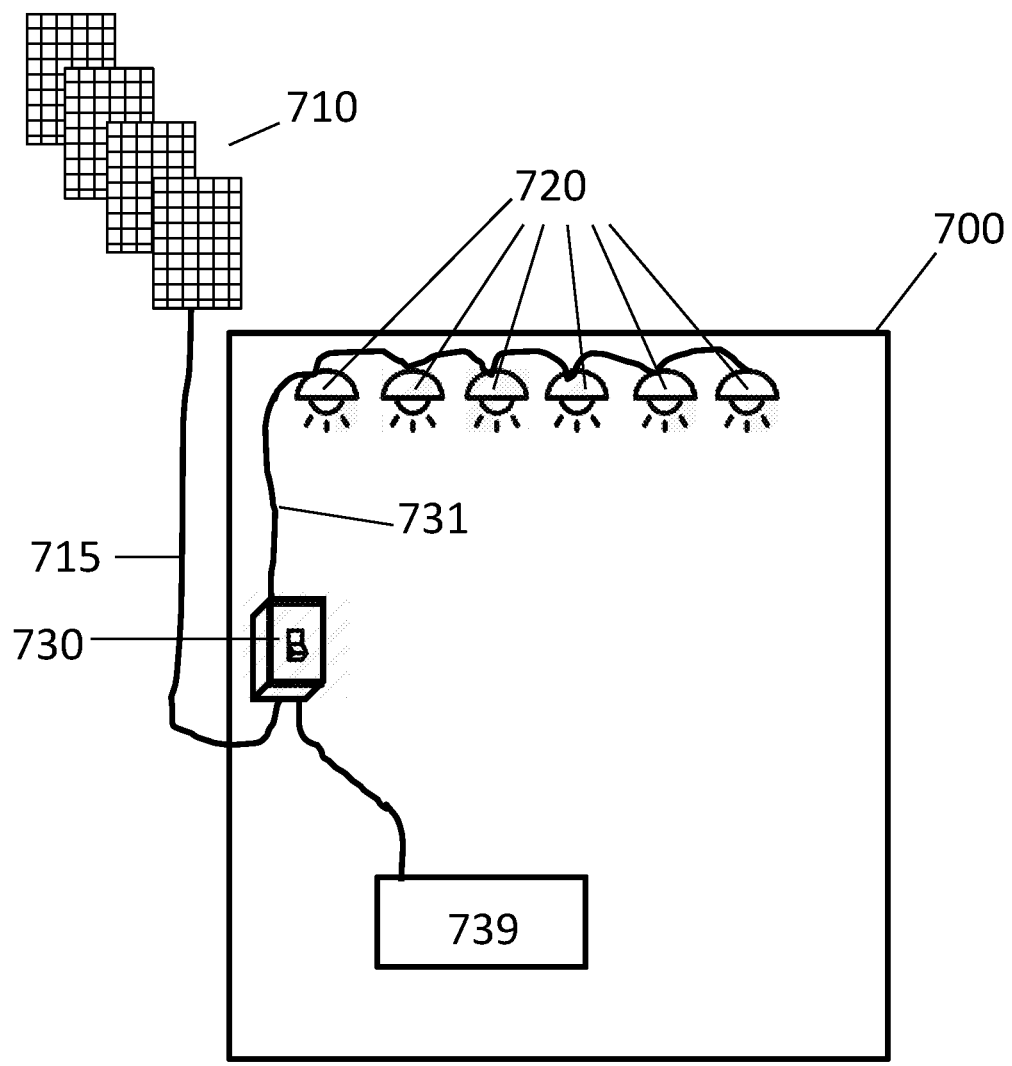
FIG. 7 shows an interrupted DC switch controlling room lighting.

As shown in FIG. 7, solar panels 710 or other source of solar power at a high voltage output of greater than 100 volts connects to switch 730 in room 700 via wire 715. Switch 730 controls LED lights 720 connected in series to use the high voltage. This system does not use DC/AC conversions and does not require a large DC conversion via an inductor based buck or boost conversion circuit to supply lighting fixtures such as 720. Accordingly, efficiency is much higher and allows exploitation of solar energy at low light (cloudy or rainy condition) levels. Other circuits that buck or boost voltage are optimized at higher light levels and have insufficient efficiency during rain or heavy clouds.

Preferably the maximum power output voltage of solar power 710 is at least 100 V and even greater than 200 volts, in regions where 200-240 volt AC grid is used. The power at wiring 731 from box 730 to lights 720 preferably is an interrupted (phase width modulated) DC from the DC input power of wiring 715. The interrupt rate of power supplied to LEDs 520 preferably is at least 100 and more preferably at least 200, and rates between 1000 and 30,000 usable, with above 20,000 particularly usable as described above.

Switch 730 comprises (see FIG. 8) at least a feed forward or MPPT determined optimum voltage control 820, which prevents loading input 810 below a threshold voltage. Control 820 may be a circuit comprising a comparator with one input that samples voltage from the solar power, and another input connected to a voltage reference. As the solar power voltage exceeds a threshold voltage, the comparator outputs a signal to increase (or start) conduction from input 810 to the connected LED string 720 of FIG. 7 via a PWM controlled transistor.

The feed forward control serves to maintain the solar power output voltage within a small range, which should be below (preferably up to 15% below) the solar power maximum power output, depending on temperature effects. Alternately an MPPT controller can set loading to the panels at a similar voltage prior to interruption by the DC interrupter circuit. Optionally an external power or battery (not shown) may be added in parallel to supplement or replace solar power during cloudy or rainy conditions.

Figure 8:
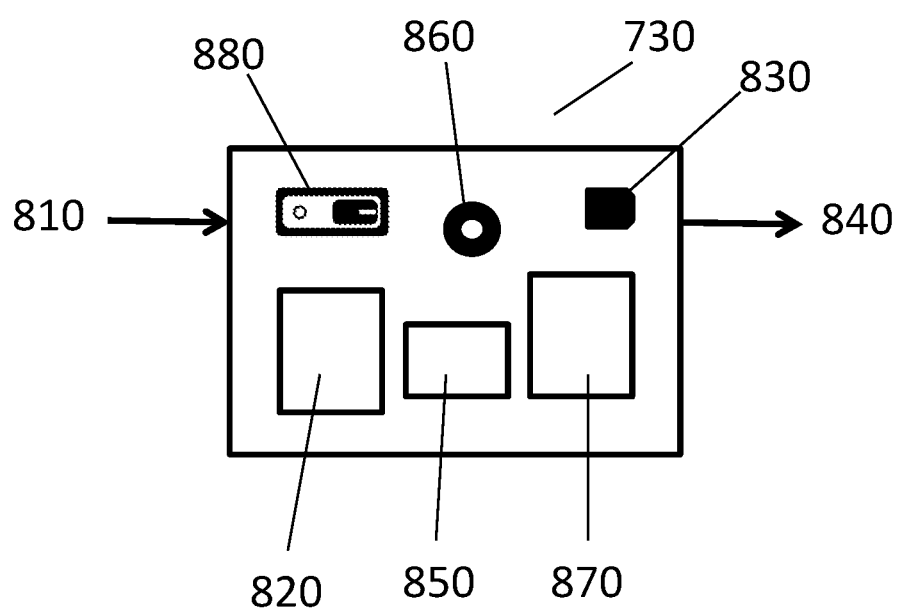
FIG. 8 shows a block diagram of the DC switch device.

FIG. 8 shows a feed forward control embodiment. Feed forward control 820 comprises a comparator and may be part of a micro-controller or other microprocessor, or a discrete device. A user operable voltage threshold input 850 sets the threshold, preferably by adjusting a voltage reference for the comparator. In an embodiment input 860 is an adjustable potentiometer that affects a voltage that is compared.

In an embodiment input 860 is another user input such as a key pad or screen touch input to a cell phone input or computer that communicates with switch 730. In practice, an installer of the system would wire up solar power 810 having a known nominal maximum power voltage and set input 860 for a threshold voltage below that voltage (preferably by 5-20%). Alternatively an MPPT system may be used to set the threshold. In a preferred embodiment some or all functions (comparator, PWM, user input) take place in a microcontroller, or microprocessor, which may interact with one or more components 870 via a stored program.

Switch 730 preferably is self-powered and uses some of the input power for its internal circuits such as PWM controllers, micro-controllers, transistor switching and the like. Component 736 in box 732 serves this function and preferably includes a small (<5 watt) buck inverter to generate, for example 5 volts, 12 volts or 15 volts power to power the other circuits of 735 and 737.

The feed forward (or MPPT determined optimum voltage) control signal from component 820 is received by component 870, which uses the signal to control a digital switch (such as transistor 830) that connects power flow from solar power 710 to LEDs 720. Preferably components 820 and 870 are combined in one microcontroller or microprocessor that has a comparator and PWM function. An advantage of this system is the high efficiency of use (>80%, esp. >90% from panels to LED consumption) at low light levels, and the ability to merely add more panels in parallel to produce electricity at low light conditions.

Preferably this system has no DC/AC inverter and no buck/boost inductor based voltage converter but relies on matching a high solar power voltage with a similar high voltage LED string that has a voltage below but within 25% of the solar power maximum power voltage. As usual in many LED power circuits, one or more resistors preferably are included in the power line from LED switch 730 to LEDs 720 in order to compensate for temperature caused LED impedance changes.

Switch mechanism 880 is a standard toggle switch designed for high voltage AC use but can be substituted by a variable controller that dims light by decreasing duty cycle of PWM component 870 that controls the on time of transistor 830.

In preferred embodiments solar power input 710 is replaced by other power sources such as batteries, utility power, wind power and the like. In these cases, feed forward control is not used in LED switch 730 to control the interruption of DC. LED switch 730 may include output voltage limiting (voltage feedback) and/or output current limiting. In an embodiment a battery power 740 is connected to the switch and supplies power in parallel with input 710.

In a factory or other location LED switch 730 may be used to control non LED equipment such as motors or other heating (eg. kitchen appliances) equipment that can use interrupted DC.

School Lighting and Equipment

The inefficiency and cost problem of using solar electric DC power by end user equipment is alleviated by specific devices that utilize an interrupting DC technique. Also, by reacting to small voltage changes in the solar electric power, appliances can automatically prioritize. This allows high priority appliances such as computers and indoor lighting to stay on and low priority appliances such as water heaters to turn off during cloudy conditions.

This embodiment provides basic lighting for a school without necessarily requiring a battery. The solar power is also used for equipment such as light projectors, computers, cell phone chargers and cleaning equipment.

Figure 9:
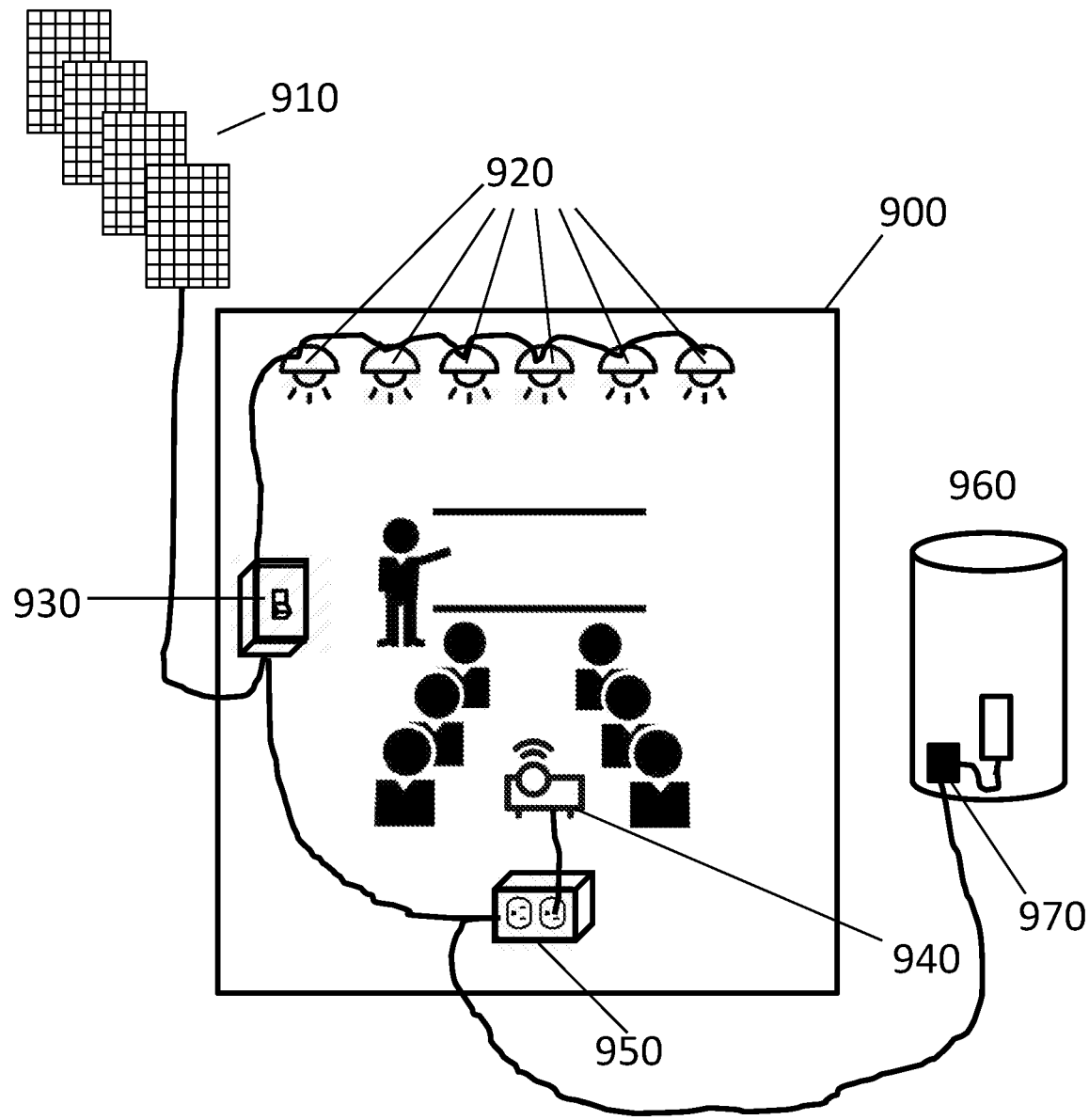
FIG. 9 shows a school powered by an embodiment.

FIG. 9 shows a system that provides solar electric power for a classroom without a necessary battery. Switch 930, LED lights 920 and solar power 910 operate as described above. Outlet power 950 provides high voltage output such as 100-120 volts (AC RMS or Interrupted DC) for Japan/United States compatible equipment or 200-240 volts for other countries. Preferably, outlet power 950 has an input voltage feed forward control with a threshold (or MPPT optimum established) voltage higher than the feed forward threshold voltage of LED switch 930. This allows lights to stay on when insufficient solar power is available to run appliances plugged into outlet 950.

In an embodiment extra unused solar energy from 910 is automatically used by electric heater tank 960, which is connected in parallel to light switch 930. Control circuit 970 for tank 960 has a feed forward voltage control circuit set with a threshold voltage higher than other threshold voltages of the one or more 930 light switches and one or more outlets 950. When these other loads are not consuming all solar power available, the output voltage from solar power 910 drifts up, activating the voltage sensitive connection to tank 960. Controller 970 comprises a comparator, a threshold voltage determination input, a PWM generator and a controlled transistor as described above, as separate components, or combined into one or more controller chips.

In an embodiment a battery preferably having an output voltage at or below the first threshold voltage is used to provide power at or below the first threshold voltage. The battery is connected in parallel with any of the connected wires shown. As solar power voltage drops to the battery voltage level, the battery contributes to power flowing to the lights. This simultaneous use overcomes temporary cloudy conditions while optimizing solar energy received during the cloudy conditions. The battery voltage may be boosted to the higher voltage by an inverter in this situation. In an embodiment a small battery (big enough to power the lights for at least one hour but not big enough to power a 1 kw appliance) may be used to supply power to both the lights and to the higher priority circuit 950.

DC Circuit Breakers

Interrupt DC Voltage Flowing Through Switch/Circuit Breaker Contacts

Figure 10:
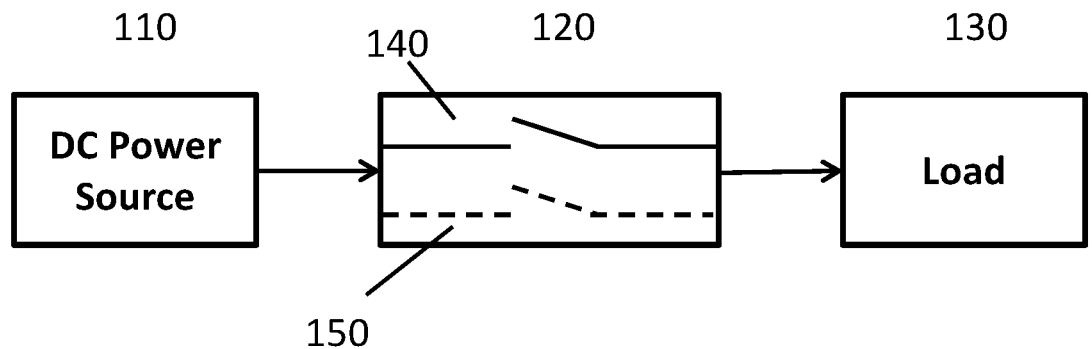
FIG. 10 shows a circuit breaker embodiment.

FIG. 10 depicts a regular contactor type circuit breaker 120 that connects DC power source 110 to load 130. In an embodiment one contactor 140 switches one side such as the positive line side. In an embodiment a second contactor 150 also switches a second side such as the negative line side. Larger numbers of contactors within the breaker such as 3, 4, 6, or 8 may be used as well. For convenience only one set of contacts are shown in FIGS. 11 and 12.

Figure 11:
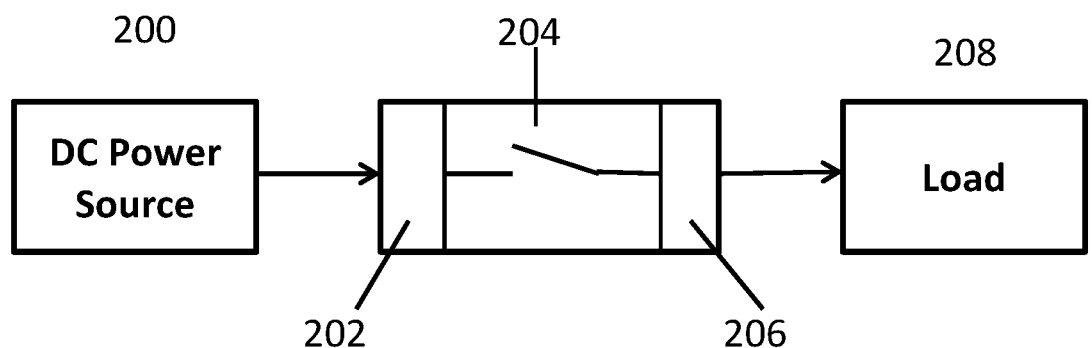
FIG. 11 shows a circuit breaker embodiment.

In an embodiment shown in FIG. 11, DC power source 200 is interrupted by an interrupter located at 202 (between the DC power source 200 and contactor 204) preferably, or at 206 between the contactor(s) 204 and load 208. The interrupter 204 interrupts the DC power by at least 120 Hz, preferably at least 250 Hz, more preferably by at least 500 Hz, and more preferably by at least 1000 Hz. In an embodiment, the interrupt rate is at least 20 kHz. In an embodiment the interrupt rate is dithered, as described above.

The interrupted DC has an off time of less than 3%, preferably less than 1%, more preferably less than 0.5%, and in some embodiments, less than 0.2%. The interrupter circuit preferably is a PWM circuit implemented as a standalone PWM chip or more preferably carried out by a microcontroller. The electrical power to activate the PWM controlled switch such as a MOSFET transistor or IGBT transistor or other device comes from the input from the DC power source itself (i.e. self-powered).

Figure 12:
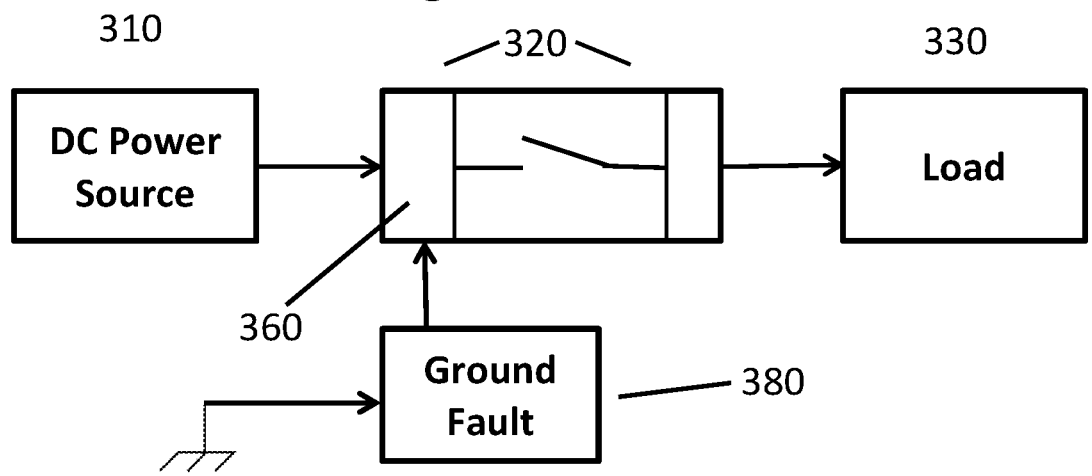
FIG. 12 shows a ground fault detection embodiment.

In the embodiment of FIG. 12 ground fault sensor 380 activates the interrupter 360 of circuit breaker 320 to shut down upon detection of a ground fault. A ground fault may be detected by a variety of known techniques, such as by a circuit that senses an imbalance in current between each of two wires of a circuit and earth ground or injects a high frequency energy into earth ground and senses that frequency in one or both power source lines. FIG. 12 shows ground fault 380 connected to interrupter 360 on the DC power source side of circuit breaker 320, but can instead of or in addition to, also sense a ground fault, (such as a current imbalance) on load 330 side of circuit breaker 320.

In an embodiment an existing AC circuit breaker is modified by addition of an interrupter in series with at least one switched line to allow at least equal amounts of interrupted current and voltage DC to be used with the same sized electrical contacts used for AC switching of the same voltage and current. This can allow conversion of an AC circuit breaker to an equivalent RMS voltage (eg. within 10%, 25% or 50% of the AC voltage rating) DC circuit breaker capable of handling the same current load. Preferably the interrupter is a semiconductor switch powered by the applied input power and is physically located within or on the circuit breaker housing. Preferably an electromagnetic AC breaker is used and preferably without controlling ambient gas composition at the breaker contacts.

Solar Electric Power Outhouse

Solar electricity can be used for an entire system such as an outhouse that provides various powered features such as for example, running water, water purification, fan, lights, water heating, hand washing, freeze prevention in cold climates, radio communication, cell phone charging, and the like. In an embodiment, expensive voltage changing and DC/AC changing is minimized to increase efficiency of solar energy use and use prioritization is carried out by differential loading of solar panels as described above.

Figure 13:
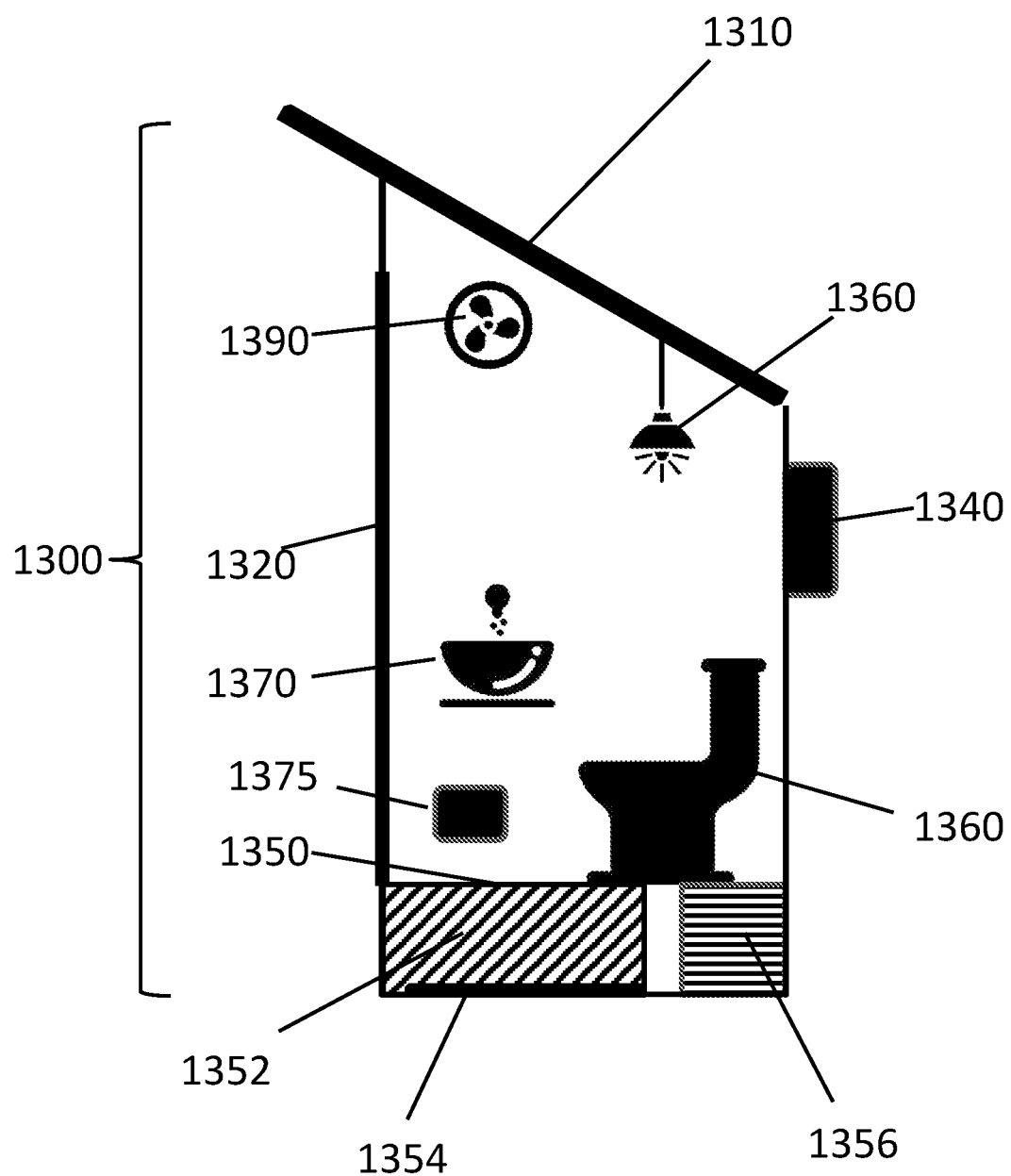
FIG. 13 shows a powered toilet room embodiment.

FIG. 13 shows an outhouse 1300 that is powered independently by solar electric generation surface 1310 at the roof. The front side has door 1320 which leads to a single room with back wall 1330, which is preferably (in this embodiment) about 1.8 meters tall over floor 1350 (plus or minus 0.2 meters). Toilet 1360 sits above water supply tank 1352, which is below floor 1350. Under (preferably) or within tank 1352 is electric heater 1354. The floor accommodates tank 1354 and equipment 1356 via a depth of preferably about 15 to 50 cm. Additional optional feature further include infrared heater 1375, fan 1390, and sink 1370, and electric water tank heater 1340. Optional features cell phone charger and other small powered electrical outlet are not shown.

Equipment 1356 shown optionally under the floor in FIG. 13 has a small battery to operate light 1380, a water pump and optional fan 1390. In a preferred embodiment equipment 1356 further includes a water purification unit that allows the outhouse to accept fluidic hookup to a nearby stream, lake or other source of water. Preferably the water purification uses the pump with a particulate filter followed by an ultraviolet light sterilizer. In an embodiment the water purifier can be used for community water supply in the event of emergency such as earthquake or other problem.

Figure 14:
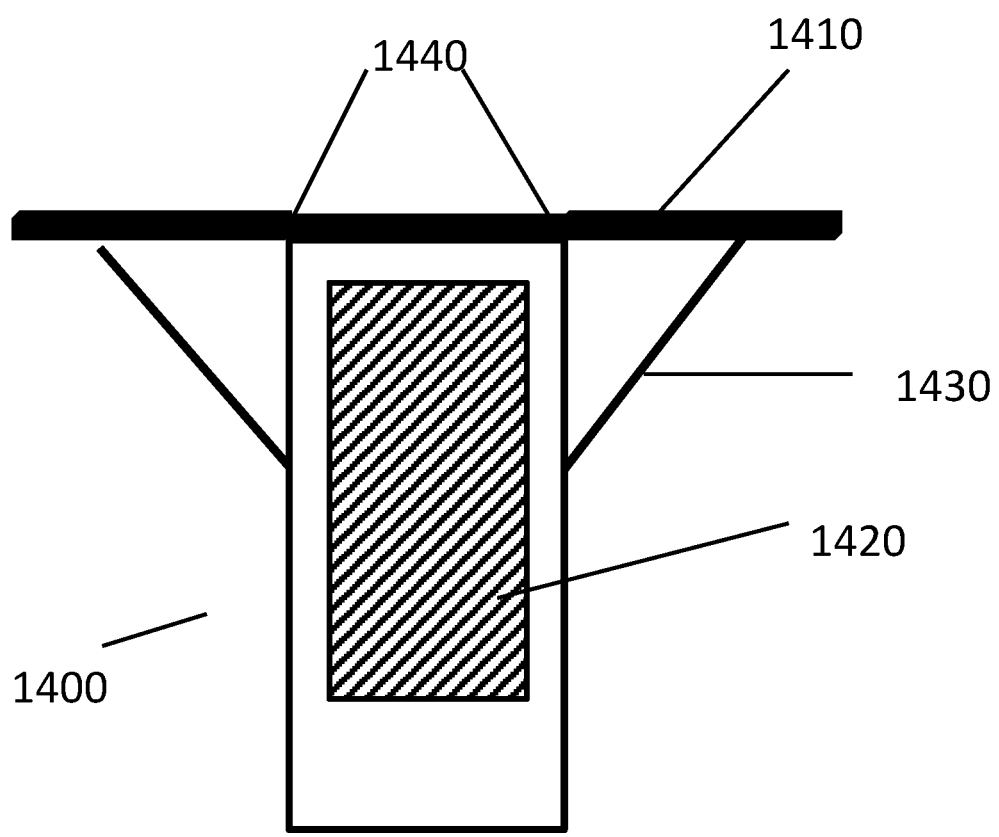
FIG. 14 shows solar panels on a powered toilet room.

FIG. 14 shows outhouse 1400 with solar panels 1440 mounted above door 1420. Solar panels may be held up with apparatus such as struts 1430. Hinges 1440 are preferred that in combination with struts 1430 allow transport of outhouses via truck in compact form. The solar panels are tilted down away from the door as shown in FIGS. 13 and 14 but may be in other orientations. However, preferably solar panels extend out via protrusion 1395 past the foot print of the outhouse in the upper side of the roof as shown in FIG. 13, and preferably are hinged as shown in FIG. 15, to facilitate packing multiple outhouses on a single truck bed for compact transport.

The power from solar panels 1310 are used for multiple services singly, or simultaneously as determined by availability of power and load, and preferably is prioritized via threshold voltage as described above. Preferably the panels are connected in series to generate at least 100 volts, suitable for driving electric heating elements and infrared heaters. In an embodiment the panels are series connected to supply at least 200 volts.

Two or more circuits connect solar panel output to loads, including two or more of: battery charging; water pump; water purification (ozone generator or UV generator etc); cell phone charging; water supply tank heater to prevent freezing; hot water tank; infra-red heater; light(s); fan(s); and radio communications. A higher priority load such as battery charging and lighting is prioritized by selecting a lower threshold solar panel output voltage via the connection circuit of that load. A lower priority load such as a water supply tank heater is connected by a circuit that has a lower threshold voltage. In this way, the solar panel output can be both prioritized and more fully used. A use can select two or more loads and decide their priority accordingly by adjusting the circuits.

For example, in winter at a cold location, the water supply tank heater, as a lowest priority load would get all of the excess available energy to keep the water from freezing. Because voltage changes are minimized, and preferably avoided altogether, the transfer of solar energy from the panels to the end use is near 100% efficient even at low light levels such as during rain/snow storms and early in the day. This helps prevent freezing of pipes even in winter when low sunlight is available. In contrast, other systems of supply and control generally use voltage conversions that waste much energy and often don't even work at light levels below 20%. In contrast, a three medium sized panel system shown in FIG. 13 can generate about 500-900 watts at high sunlight but at 10% light level can generate 50-90 watts of heat at the water supply (or as heaters around pipes etc) to prevent freezing in the Winter.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

I claim:

1. A high voltage solar powered lighting switch comprising:
   a first electrical input connection for solar electric output voltage of greater than 100 volts;
   a second electrical input connection for an external utility power and which is connected in parallel with the first electrical input;
   a PWM controller that controls a circuit of multiple LED lights connected in series to directly consume the high voltage solar electrical output voltage and that generates an interrupted DC power of more than 120 interrupts per second at more than 90 percent duty cycle; and
   a user operable switch for a user to input a voltage threshold;
   wherein the lighting switch, the user operable switch, the solar panel power that feeds the switch, the external utility power and the connected LED lights lack any DC to AC inverter and lack an inductor based buck or boost voltage converter for providing power to the multiple LED lights.

2. The lighting switch of claim 1, wherein the duty cycle is controlled to maintain the first threshold output voltage of the solar panels.

3. The lighting switch of claim 1, wherein the interrupt rate is above 1000 Hz and is dithered.

4. The lighting switch of claim 1, further comprising a power outlet circuit connected to the solar power that provides interrupted DC power to other appliances,
   wherein the power outlet circuit has a second threshold output voltage that is set to a lower or higher voltage to allow prioritization of power to the outlet or to the lighting switch, respectively.

5. A high voltage solar powered lighting system comprising:
   multiple LED lights connected in series to directly consume a high voltage of over 100 volts; and
   a switch controller having
   i. a first electrical input connection for solar electric output voltage of greater than 100 volts,
   ii. a second electrical input connection for an external utility power and which is connected in parallel with the first electrical input,
   iii. a PWM controller that controls an output to the multiple LED lights connected in series to directly consume the high voltage and which generates an interrupted DC power of more than 120 interrupts per second at more than 90 percent duty cycle, and
   iv. a user operable switch for a user to input a voltage threshold;
   wherein the switch controller, the user operable switch, the solar panel power that feeds the switch, the external utility power and the connected LED lights lack any DC to AC inverter and lack an inductor based buck or boost voltage converter for providing power to the multiple LED lights.

* * * * *